March 15, 1927. 1,621,442
J. W. THROPP
SAFETY STOP MECHANISM
Original Filed Aug. 26, 1925 5 Sheets-Sheet 3

March 15, 1927. 1,621,442
J. W. THROPP
SAFETY STOP MECHANISM
Original Filed Aug. 26, 1925   5 Sheets-Sheet 4

Inventor—
Joseph W. Thropp.
by his Attorneys.—
Howson & Howson

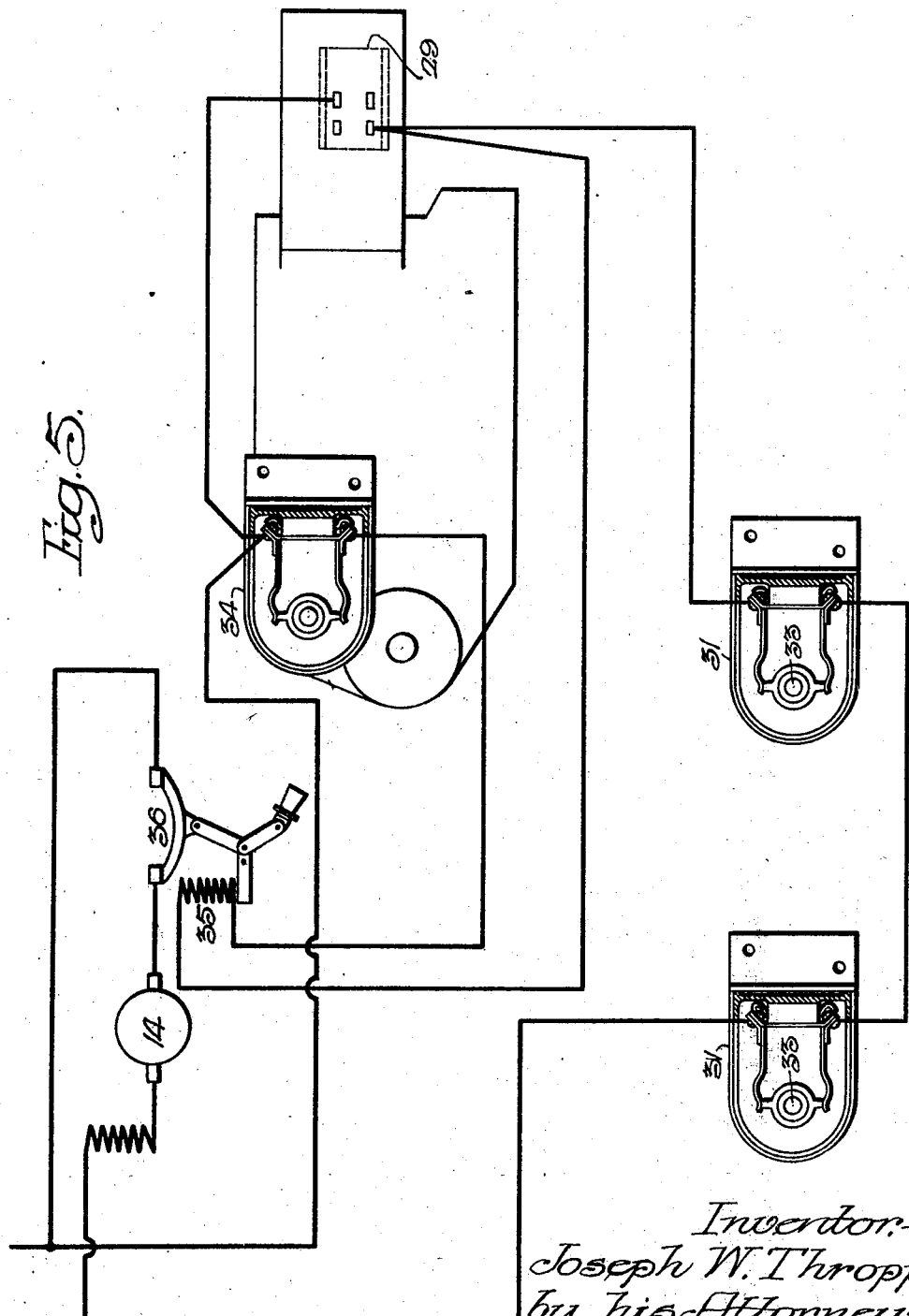

Patented Mar. 15, 1927.

1,621,442

UNITED STATES PATENT OFFICE.

JOSEPH W. THROPP, OF TRENTON, NEW JERSEY.

SAFETY STOP MECHANISM.

Application filed August 26, 1925, Serial No. 52,615. Renewed December 11, 1926.

The invention relates to a safety stop mechanism having the same general purpose and function as that shown and described in my Patent No. 1,490,788, dated April 15, 1924. As stated in the said patent, safety stop mechanism of this type are particularly applicable to machines having exposed rollers, where there is danger of the operator being caught between them. A rubber mixing machine constitutes an example. It will be understood, however, that the invention is not necessarily limited to machines of this type.

In accordance with the present invention, I avoid the use of the mechanical connections for setting the brakes and employ electrical connections for this purpose. The principal object of the invention is to provide an electrically controlled and gravitally operated brake mechanism which is entirely reliable in its operation and which is so constructed as to use a minimum of current. Other objects of the invention will be apparent from the following specification and claims.

In the accompanying drawings, I have shown the embodiment of the invention which I now deem preferable but it will be understood that the drawings are for illustrative purposes only and that various changes and substitutions within the scope of the appended claims may be made without departing from the spirit of the invention.

Of the drawings:

Fig. 5 is a diagram of electrical connections.

Figure 1:
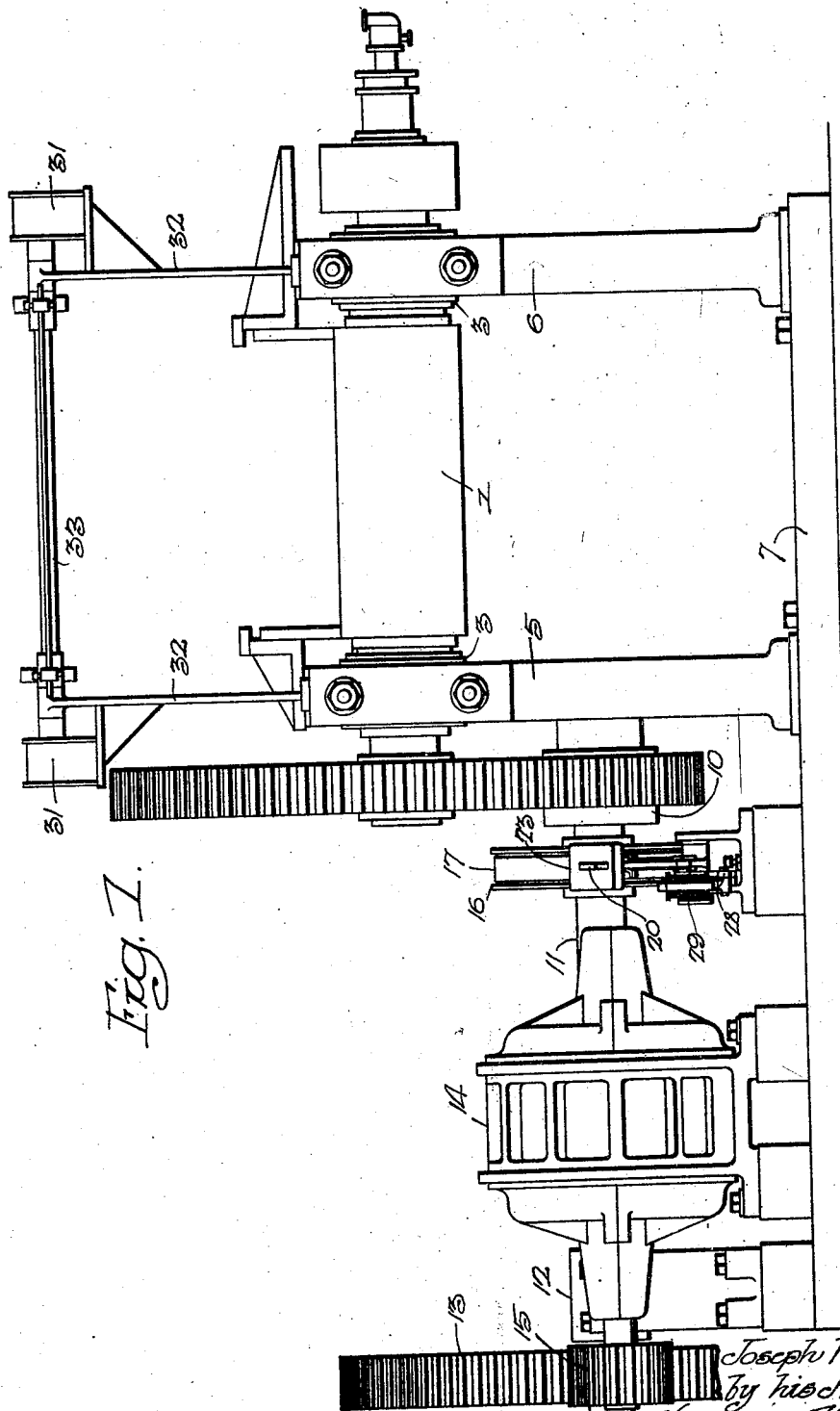
Fig. 1 is a front view of a rubber mixing machine having the invention incorporated therein.
Figure 2:
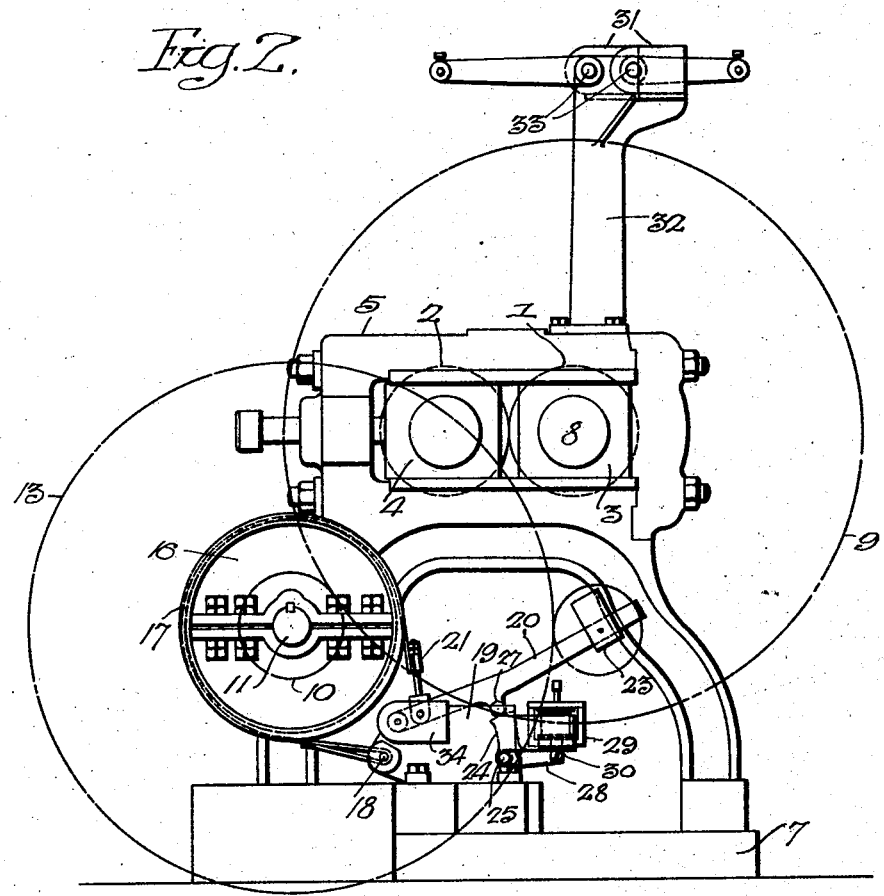
Fig. 2 is an end view of the machine shown in Fig. 1, the electric motor being omitted.

Referring particularly to Figs. 1 and 2 of the drawings, 1 and 2 represent horizontal mixing rollers which are journaled respectively in bearing boxes 3 and 4. The bearing boxes 4 are horizontally slidable in guides carried by vertically extending housings 5 and 6, these housings being mounted on a base frame 7. One of the rollers, as for instance 1, is provided with a projecting shaft 8 which carries a large gear wheel 9. A pinion 10 secured to a jack shaft 11 meshes with the gear 9. This shaft 11 is journaled in a bearing 12, mounted on the base frame 7, and a bearing on the housing 5 and carries a driving gear 13. A suitable power source is provided and preferably this is an electric motor 14 also mounted on the base frame 7. The motor shaft is provided with a pinion 15 which meshes with the gear 13.

Figure 3:
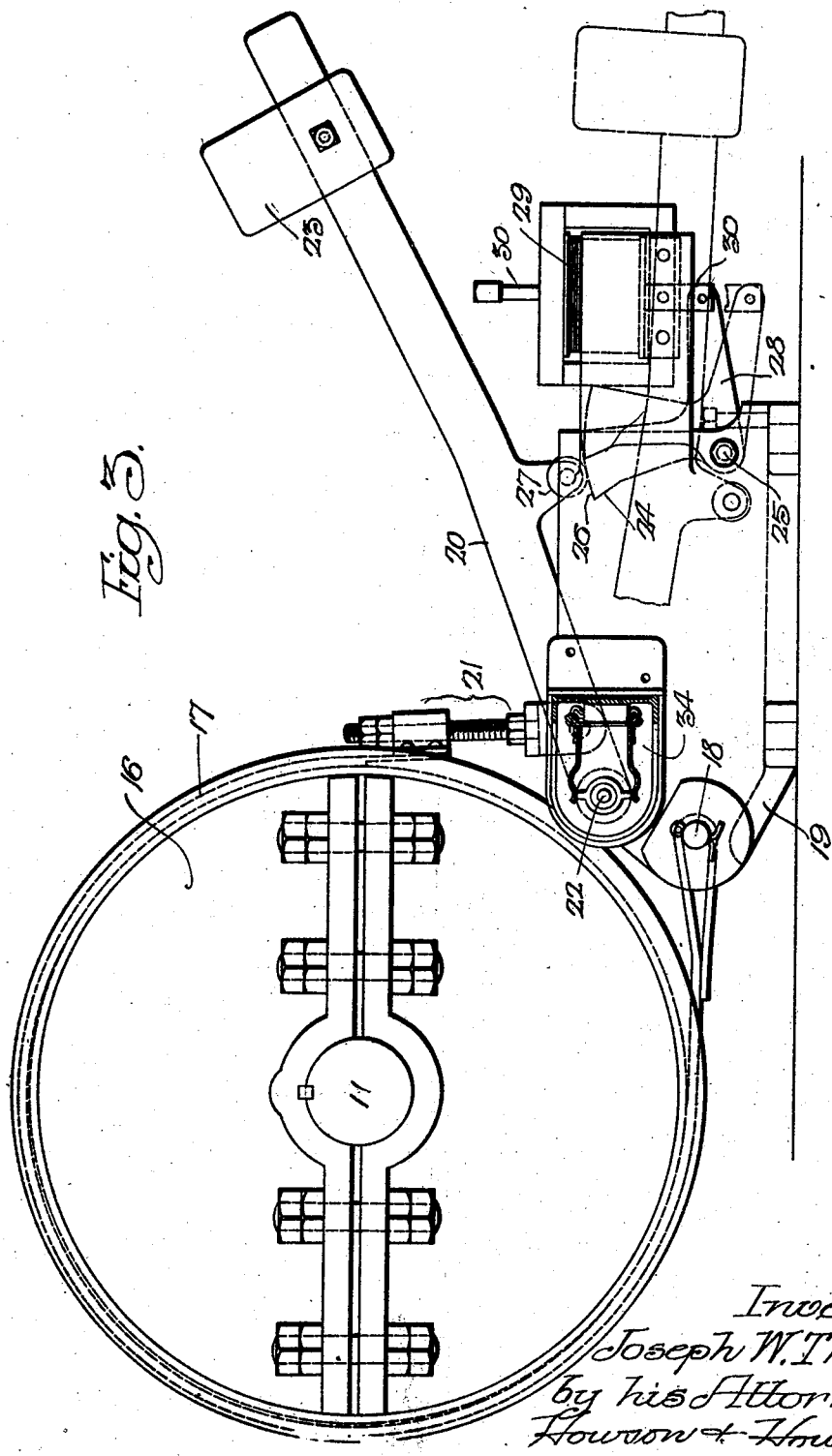
Fig. 3 is an enlarged detail elevational view showing the brake apparatus to which the invention particularly relates.
Figure 4:
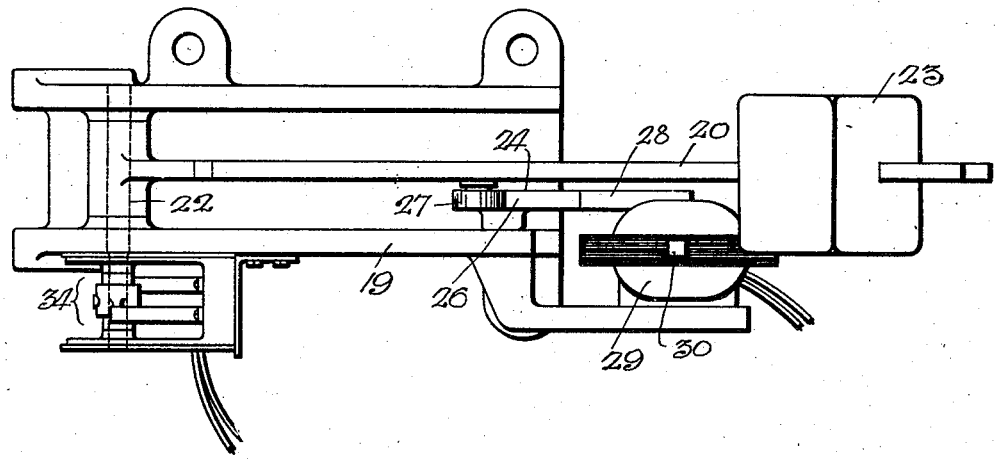
Fig. 4 is a plan view illustrating some of the parts of the apparatus shown in Fig. 3.

It will be observed that a brake drum 16 is rigidly secured to the power shaft 11 and, as shown in Figs. 3 and 4, this drum is provided with a co-operating brake band 17 having one end rigidly secured to a pin 18. This pin is secured between oppositely positioned walls of a supporting device 19 mounted on the bed plate 7. The other end of the brake band 17 is secured to a brake actuating lever 20 through an adjustable block and bolt mechanism 21 of known design. The brake lever 20 is mounted on a pin 22 which is also journaled between the two walls of the supporting device 19. The other end of the brake arm 20 carries an adjustable weight 23, which tends to move the brake arm 20 into the dotted line position shown in Fig. 3, at which position the brake band 17 frictionally engages the brake drum 16 so as to prevent the turning of the shaft 11.

In order to resist the action of the weight 23, I provide a suitable latch device 24 which is mounted for movement about a horizontal pivotal pin 25. The latch device 24 preferably has a bearing surface 26 which is concentric with the pivotal axis at 25, and this concentric surface 26 co-operates with a suitable supporting means associated with the lever 20. As preferred and as shown, the lever 20 carries for this purpose a roller 27 which directly engages with the surface 26. It will be clear that so long as the roller remains in tangential engagement with the surface 26, there can be no vertical movement of the lever 20.

I preferably provide means normally tending to move the latch device 24 in the clockwise direction so as to release the roller 27 and thus permit the brake to be engaged or set by the weight 23. Any suitable means may be provided for this purpose but I prefer to employ a lever arm 28 preferably formed integrally with the latch device. This lever arm and the parts associated therewith are sufficiently heavy to move the latch device as described. I provide means for holding the latch device in its operative or left hand position, this means preferably being electro-magnetic. As illustrated there is a solenoid 29 having a core 30 which is preferably directly pivoted to the lever arm 28. The construction of the solenoid is such that when it is energized the core is drawn upward thus moving the latch device in the counter-clockwise direction and holding it in its left hand or operative position. When the solenoid is deenergized the weight of the lever 28 and of the core 30 will move the latch device in the clockwise direction thus releasing the roller 27 and permitting the weight 23 to drop and apply the brake.

For controlling the current through the solenoid 29, I provide one, and preferably two, switches, 31, 31. When two switches are provided they are arranged in series. As shown in Figs. 1 and 2 these switches are mounted on standards 32, 32 on top of the mixing machine. Connected with the respective switches are two pivotally mounted horizontal rods 33, 33 which are normally held in the positions shown in Fig. 2, these positions corresponding to the closed positions of the switches. In case of any accident or emergency requiring the machine to be quickly stopped either of the rods 33, 33 may be moved downward to thus open the corresponding switch 31 and deenergize the solenoid 29.

The various electrical connections are shown in Fig. 5 wherein the two switches 31, 31 are shown as being in series with the solenoid 29. It will be clear that when either of these switches is operated the solenoid 29 will be deenergized as described, thus causing the brake to be applied.

I preferably provide a switch 34 which is connected with the brake lever 20 so as to be closed when the lever is in its upper position and opened when the lever is in its lower position. The construction and the mounting of this switch are substantially the same as shown and described in my aforesaid patent. As shown in Fig. 5, this switch 34 is connected in parallel with the solenoid 29. Connected in series with the switch 34 is the undervoltage coil 35 of a circuit breaker 36. This circuit breaker is connected in series with the circuit of the motor 14. It will be clear that the opening of either of the switches 31, 31 will not only deenergize the solenoid 29 and cause the brake to be set, but will also cause the undervoltage circuit breaker 36 to open and thus stop the motor 14. The setting of the brake causes the switch 34 to open and this makes it impossible for the motor to be again started until after the brake mechanism has been manually released. The switches 31, 31 after being opened will ordinarily be closed again but it will be clear that this action will not cause the machine to again start. Even if the operator should attempt to close the circuit breaker 36 this circuit breaker would immediately reopen for the reason that the circuit of the coil 35 remains broken until the brake mechanism has been released, thus closing the switch 34.

What I claim is:

1. The combination with a power shaft to be controlled and a source of power therefor, of a brake apparatus associated with the said power shaft, means normally tending to move the brake apparatus into set position, a pivoted latch device having a surface concentric with its pivotal axis, means adapted to be engaged by the said concentric surface for resisting the movement of the brake apparatus into set position, and an electro-magnetic device for causing the movement of the said latch device to disengage the concentric surface from the last said means and thus permit the brake apparatus to be moved into set position.

2. The combination with a power shaft to be controlled and a source of power therefor, of a brake apparatus associated with the said power shaft, a weight normally tending to move the brake apparatus into set position, a horizontally pivoted latch device having a surface concentric with its pivotal axis, means associated with the weight and adapted to be engaged by the said concentric surface to support the weight, and an electro-magnetic device for causing the movement of the said latch device to disengage the concentric surface from the weight supporting means and thus permit the brake apparatus to be moved into set position.

3. The combination with a power shaft to be controlled and a source of power therefor, of a brake apparatus associated with the said power shaft, a weight normally tending to move the brake apparatus into set position, a horizontally pivoted latch device having a surface concentric with its pivotal axis, means associated with the weight and adapted to be engaged by the said concentric surface to support the weight, means normally tending to move the latch device into position to disengage the weight supporting means, and a solenoid adapted when engaged to hold the said device in position to engage the weight supporting device.

4. The combination with a power shaft to be controlled and a source of power therefor, of a brake apparatus associated with the said power shaft, means normally tending to move the brake apparatus into set position, a latch device adapted when in one position to resist the action of the last said means and provided with means normally tending to move it out of the said position, a solenoid adapted when energized to hold the said latch device in its said operative position, a manually operable switch in series with the solenoid, and a motor controlling circuit in series with the said switch and in parallel with the solenoid, the said circuit including a switch which is closed when the brake apparatus is released and open when the brake apparatus is set.

JOSEPH W. THROPP.